Sept. 4, 1934.   R. HOOVER ET AL   1,972,341
QUOTATION BOARD SYSTEM AND APPARATUS
Filed May 9, 1930   9 Sheets-Sheet 1

Inventors
RAY HOOVER
EVAN R. WHEELER
By their Attorney
Eugene C. Brown

Sept. 4, 1934.  R. HOOVER ET AL  1,972,341
QUOTATION BOARD SYSTEM AND APPARATUS
Filed May 9, 1930  9 Sheets-Sheet 5

Inventors
RAY HOOVER
EVAN R. WHEELER
Attorney
Eugene C. Brown

Sept. 4, 1934.                R. HOOVER ET AL                    1,972,341
                    QUOTATION BOARD SYSTEM AND APPARATUS
                    Filed May 9, 1930        9 Sheets-Sheet 7

Inventors
RAY HOOVER
EVAN R. WHEELER
By their Attorney
Eugene C. Brown

Patented Sept. 4, 1934

1,972,341

UNITED STATES PATENT OFFICE 1,972,341

QUOTATION BOARD SYSTEM AND APPARATUS

Ray Hoover and Evan R. Wheeler, North Plainfield, N. J., assignors to The Western Union Telegraph Company, New York, N. Y., a corporation of New York Application May 9, 1930, Serial No. 451,140

28 Claims. (Cl. 178—24)

This invention relates to a quotation board mechanism and more particularly to apparatus for visibly indicating or posting information concerning different items such as stock, bond and commodity quotations in response to telegraph signals.

One system of posting stock quotations automatically at a plurality of separate places such as brokers' offices and banks from a common transmitting point, now in use, involves the use of four channels of communication extending between the transmitting station and the receiving quotation board apparatus, separate channels being employed to transmit signals corresponding to each of the hundreds, tens, units and fractions (in eighths) values of the quotation. The four transmitting channels may comprise four separate line wires or two line wires each having battery of positive and negative polarity applied alternately thereto in a series of impulses, in conjunction with polarized relays at the receiving station, for responding to the polarity of the current transmitted over each of the lines. A single line wire may be employed, of course, with a rotary distributor at the receiving station for distributing the signal impulses to the four control channels of the quotation board.

The quotation board as heretofore constructed employs a group of four indicating units each having a dial or drum bearing the numerals 1 to 9, 0 and a blank, the four units being disposed side by side behind suitable apertures so that when properly set up the numerals on the dials may be directly observed to give the quotation. Ordinarily, five of such groups of indicators are provided for each stock or item corresponding to the "yesterday's close", "open", "high", "low", and "last" quotations of the stock.

The four control channels are also employed for selecting concurrently the range and the stock. For this purpose, each group of indicators comprising the range, i. e., the "yesterday's close", "open", "high", "low", and "last" quotations, and combinations thereof are designated by single digit numbers and each stock is arbitrarily designated by a three digit number, the stocks having the greatest volume of sales and hence those most often quoted being designated by digits of low order as 111, 121, 211, etc.

The range is selected by transmitting over channel 1 for instance, a number of electrical impulses corresponding to the digit number of the range to be posted and the stock is selected by sending over channels 2, 3, and 4 impulses corresponding in number to the hundreds, tens and units digits, respectively, of the stock designating number. The receiving apparatus in response to such impulses selects the stock and range and subsequently operates to transfer the four transmitting channels from the selecting mechanism to the magnet windings of the four indicating units of the range and stock selected. Each indicator unit may then be operated by transmitting the required number of impulses over the channels connected thereto.

In order to eliminate accumulative errors, means is preferably provided for restoring each indicator to "blank" or unison position before transmitting the quotation or answer. The restoration is accomplished by transmitting a series of ten impulses over each channel to step the indicators around to "blank" position. The ten impulses are sufficient to restore any of the indicators to unison position even in the most unfavorable setting thereof and if this position is reached with a particular indicator before the entire ten restoration impulses have been applied thereto, the ground connection is automatically removed from the winding of the indicator magnet so that the remaining impulses are ineffective to rotate the indicator further. At the conclusion of the transmission of the restoration impulses the ground connection is automatically restored to each indicator magnet so that it will respond to a further group of impulses termed the "answer" group, corresponding in number to the number of the digit of the quotation to be posted, so as to set the indicator dials in the desired position.

The present invention has for one of its objects to provide a printing apparatus for a quotation board which may be operated by the same type of signals as those employed in the above system and which may be operated concurrently with such "indicator boards" from the same signals.

Another object is to provide a printing apparatus which may be employed in place of any of the groups of indicator units used in the so called indicator boards and in which no change is required in the transmitted signals or in the indicator board control apparatus, to operate the same.

Another object is to produce stock quotation boards in which different combinations of indicator units and printing units may be employed, that is, in which the quotations of certain stocks may be posted by means of indicators, others by printing the quotation on suitable paper tapes in characters of sufficient size to be discerned at a distance and in which the quotations of still other stocks may be posted by the use of indicators for certain of the ranges such as "yesterday's close", "open", "high", and "low" and by printing mechanism for other of the ranges as the "last", all of said arrangements being usable for different stocks on the same board and different boards being arranged differently, all of said boards being operable by the same transmitted signals.

Further objects include the provision of a printing apparatus which will be of a simple and durable construction and accurate and very rapid in operation.

Another object is to provide a printing and paper feed unit for quotation boards which will be individual to each item or stock.

Further and more specific objects, features and advantages will more clearly appear from the detailed description given below taken in connection with the accompanying drawings which form a part of this specification.

The invention consists in the novel features of construction, arrangement, combination of parts, and electrical connections constituting the printing and paper feed unit and the control mechanism therefor and in the combination of such unit with the indicator units, as hereinafter described by way of example only, as being illustrative of one embodiment of the invention.

Reference will be had to the accompanying drawings for a detailed description of the invention wherein.

A system for transmitting step by step signals representative of stock or other item quotations, is described in a copending application of R. Steeneck, Serial No. 414,105, filed December 14, 1929, entitled "Signal transmitting apparatus", and in a copending application of R. Hoover, Serial No. 406,357, filed November 11, 1929, and entitled "Selecting and indicating system", a receiving apparatus is described, which is particularly adapted for the operation of a stock quotation or bulletin board in response to transmitted signals to automatically select a stock and a particular range thereof, such as the "yesterday's close", "open", "high", "low", or "last" quotation and to operate a series of indicators for posting a desired price or quotation of such selected stock.

The printing mechanism comprising the present invention is so constructed and arranged that it may be operated directly from the system and apparatus described in the said Hoover application in place of or concurrently with any of the indicator units and without the use of any additional apparatus or changes in the circuit arrangement.

Figure 1:
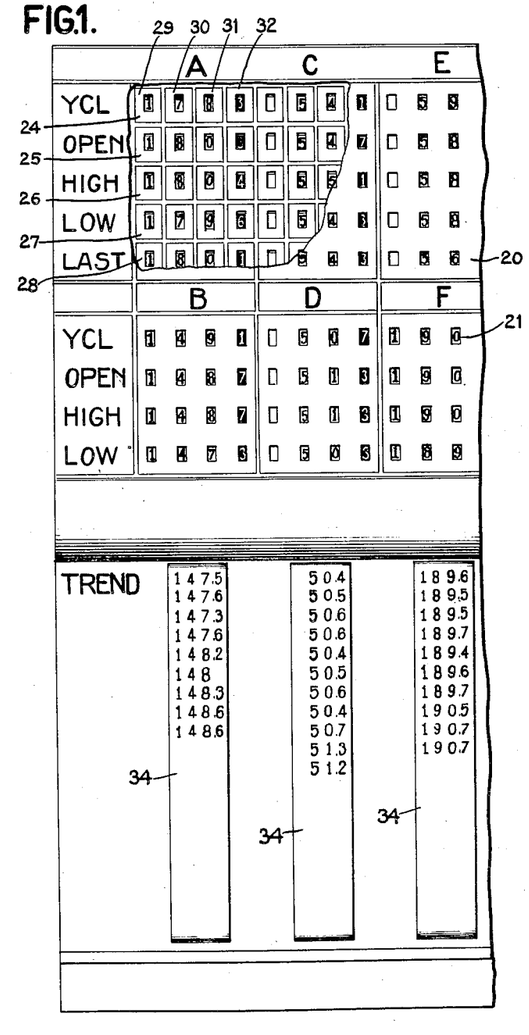
Figure 1 is a front view of a portion of a stock quotation board having provision for a number of stocks, in which indicator units are used entirely for certain stocks and a combination of indicator units and printing mechanism for other stocks or items.
Figure 2:
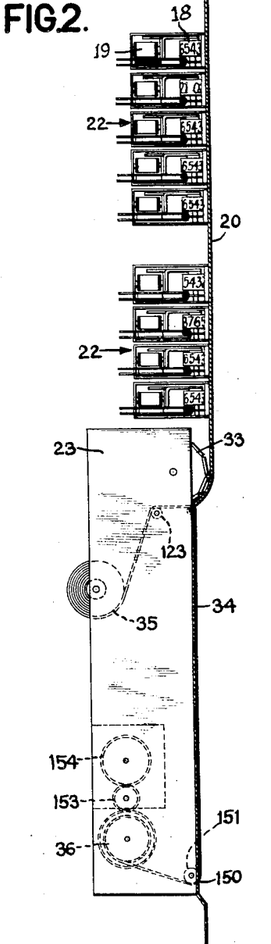
Figure 2 is a vertical section through the indicator board shown in Figure 1.

Reference will now be had to Figures 1 and 2 in which we have shown a portion of a quotation board comprising a front panel 20 having a number of apertures or windows 21 behind which are disposed a plurality of indicator units 32 and a printing unit 23. Five groups of indicator units 24, 25, 26, 27 and 28 are provided for each stock appearing at the upper portion of the board, corresponding respectively to the "yesterday's close", "open", "high", "low" and "last" quotations of the stock, each group of indicators consisting of four units 29, 30, 31 and 32.

Each indicator unit has a drum or cylinder 18 bearing digit characters, adapted to be rotated around by a step by step movement, by means of a magnet 19 in response to electrical impulses, so as to bring the proper characters appearing on the drum into view through the windows 21. Each drum is operated entirely independently of every other drum as will appear hereinafter, the construction of the indicator unit being subsequently explained more fully with reference to Figures 13, 14 and 15.

The stocks appearing at the lower portion of the board are also provided with indicators for posting the "yesterday's close", "open", "high" and "low" quotations of the stock but in place of the four indicator units corresponding to the "last" quotation, the printing unit 23 is employed.

The printing unit has four type wheels 33h, 33t, 33u and 33f, by means of which the hundreds, units, tens and fractions values of the "last" quotation are printed upon a strip of paper 34 which extends from a reel 35, beneath the type wheels 33 and downward across the face of the panel 20 to a take-up roller 36 upon which it is rewound.

The printing occurs at the lower side of the type wheels 33 after which the paper is automatically fed downward along the board a distance sufficient to bring the printed quotation into view. A sufficient length of paper is provided at the face of the board to expose a number of successive quotations of each stock, so as to give the trend of the market for a predetermined number of quotations.

In accordance with the usual method of operating indicator stock quotation boards, at the conclusion of each day's business the indicators may be set in their blank positions, with the exception of the "yesterday's close" indicators, which are operated to post the "last" quotation of the day in readiness for the opening of the market on the succeeding day. At the opening of the market when the first sale occurs of any particular stock the indicators corresponding to the "open", "high", "low" and "last" quotations are connected in parallel through the selecting system and the first sale simultaneously recorded upon each of these indicators. Subsequent sales occurring during the day actuate the "last" group of indicators only except in those cases in which the "last" sale also establishes a new "high" or a new "low" for the day in which event either the "high" or "low" indicators are operated simultaneously with the "last" indicators. It will be noted that the "last" indicators are operated in each case.

The printing unit 23 is so constructed, as will appear in detail hereinafter, that it may be operated directly from the same signals which are employed for operating the "last" indicators, the printing unit and paper feed operations occurring automatically without the transmission of any special or additional signals or without any change in the control apparatus employed for operating the "last" group of direct reading indicators, other than an extra contact upon one of the relays of the stock selecting system. Therefore, the quotation board may, at the selection of each broker, employ direct reading indicators entirely for certain stocks and printing apparatus in combination with indicators for other stocks or the board may be composed entirely of printing units in case range quotations other than the "last" are not desired and the printing boards or combination indicator and printing boards may be operated from the same signals and over the same system employed for operating the indicator boards, as will appear from reference to Figure 20.

Reference will now be had to Figures 3 to 12 for a detailed description of the printing unit. The four type wheels 33h, 33t, 33u, and 33f corresponding to the hundreds, tens, units and fractions digits of the quotation to be printed are mounted for indiviual rotation upon a fixed shaft 40. Each wheel is provided with a specially shaped star or ratchet wheel 41 by which it is individually operated with a step-by-step movement by a double armed pawl or anchor 42 mounted upon a shaft 43 which is common to each type wheel unit. The pawls 42 each have a right angled armature portion 44 by means of which they are actuated by individual electro-magnets 45h, 45t, 45u and 45f.

Figure 3:
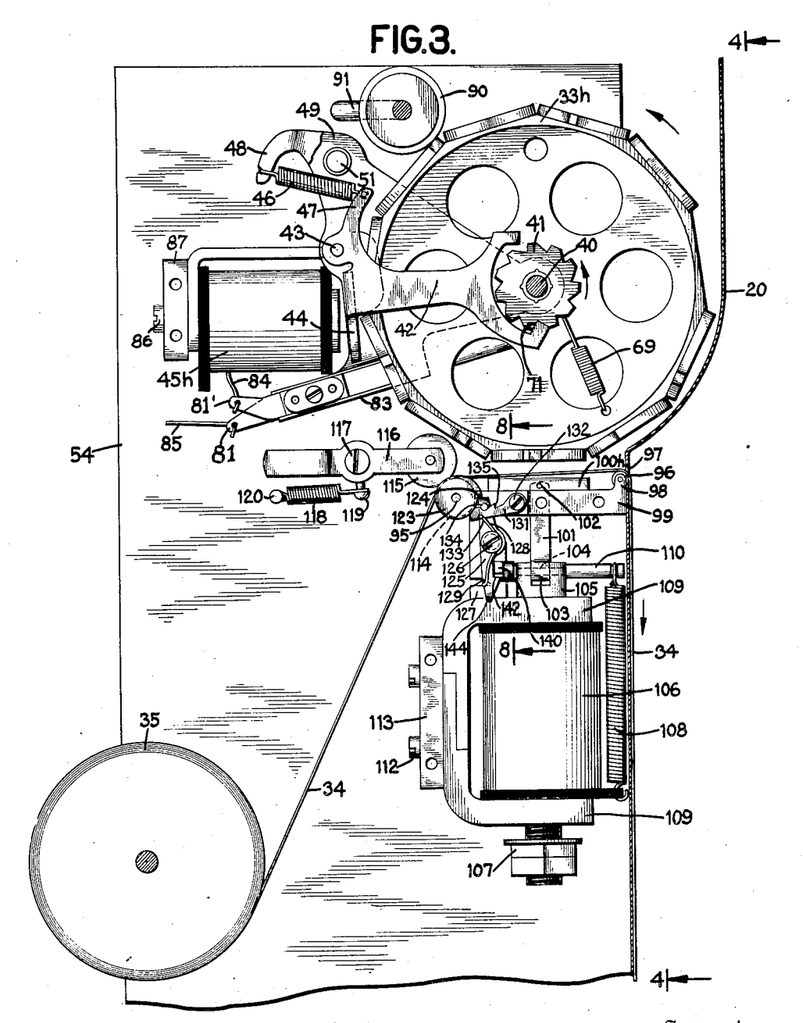
Figure 3 is a side elevation of one of the printing units, shown in its relation to the face of the quotation board.

The type wheels rotate in a counter-clockwise direction as viewed in Figure 3. Each stroke of the armature 44, in a closing direction, in response to an electrical impulse transmitted to the magnet 45, causes the upper pallet of the pawl to move downwardly against a tooth of the ratchet wheel to rotate the same counter-clockwise one twenty-second of a revolution. Upon release of the armature, the pawl 42 is moved upwardly by a retractile spring 46 to cause the lower pallet of the pawl to engage the ratchet wheel to move the same in the same direction another twenty-second of a revolution.

The type wheel has eleven flat sides bearing the characters 1 to 9 and 0 and a blank side. It is moved the distance of one character for each impulse received by its operating magnet 45.

The retractile spring 46 is secured to an extension 47 of the pawl 42 and to an offset arm 48 forming part of a bracket 49, one of which is provided between each type wheel and outside of each of the end type wheels. The brackets 49 are mounted upon the type wheel shaft 40, shaft 43 and a bar 51 parallel thereto. Tubular spacers 52 are provided on the bar 51 between the adjacent brackets 49 and between the brackets and the side plates 53 and 54. The unit is assembled between the side plates 53 and 54, the shafts 40 and 43, and the bar 51 having their ends secured therein.

Each type wheel unit comprises a type wheel 33, a ratchet wheel 41 and a commutator 55, the unit being mounted upon a sleeve 56 bearing on the shaft 40. The ratchet wheel 41 is mounted upon a reduced portion 57 of the sleeve 56 and is secured to the sleeve by a pin 58. The reduced end of the sleeve is upset at a number of points 59 to further secure the ratchet wheel thereto. The type wheel 33 is mounted on a reduced portion 61 of the sleeve for a limited rotation thereon and is retained against lateral movement by a disc or washer 62 carried by a further reduced portion 63 of the sleeve 56. The commutator 55, the construction of which will be presently described, abuts against the washer 62, this latter member being provided with tabs 64 extending through the commutator and being bent over against the outer face thereof to secure the washer thereto. The commutator is fixed in definite angular position relative to the sleeve 56 by upsetting the reduced portion 63 of the sleeve 56 into the outer face of the commutator, as indicated by the numeral 65.

The hub 66 of the type wheel 33 has a short recess 67 in one side thereof and the sleeve 56 has a radial pin 68 fixed thereto extending out through the recess 67 whereby limited relative rotation of the type wheel and ratchet wheel may occur. The pin is normally retained against the rear wall of the recess by a coiled spring 69 attached to the pin and to the wheel 33, adjacent its periphery.

In the normal operation of the quotation board the operating impulses are transmitted at a rate of from 20 to 30 cycles per second and the type wheels, therefore, must rotate into printing position at a rate of from 2 to 3 revolutions per second. Due to the relatively large diameter of the wheels required to produce printed characters readable at a considerable distance from the board and to the concentration of the mass of the wheel at the periphery, the type wheels possess considerable inertia to starting. In order to reduce the load of starting on the magnets 45 and to bring the type wheels into motion gradually, the initial movement of the ratchet wheel 41 is communicated to the type wheel through the spring 69. The type wheel follows the movement of the ratchet wheel and comes to rest in its final or printing position with the pin 68 resting against the rear wall of the recess 67.

Figures 4, 11, 12:
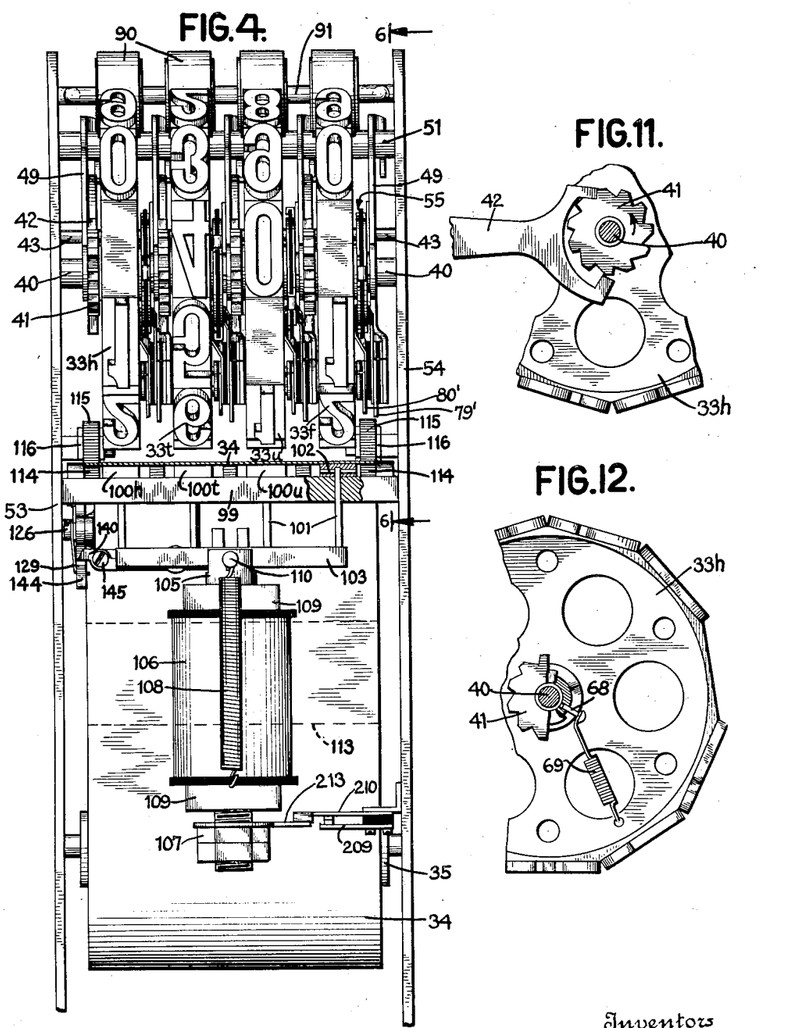
Figure 4 is a front view of the printing unit on the line 4—4 of Figure 3 with the indicator goard panel removed.
Figure 11 is a fragmentary view of the type wheel pawl and ratchet operating mechanism.
Figure 12 is a fragmentary view of a type wheel showing, partly in section, the type wheel follow-up mechanism.
Figure 5:
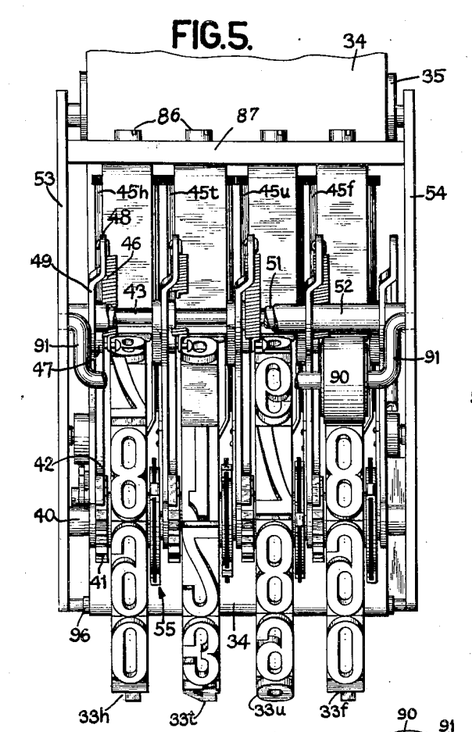
Figure 5 is a plan view of the printing unit.
Figure 6:
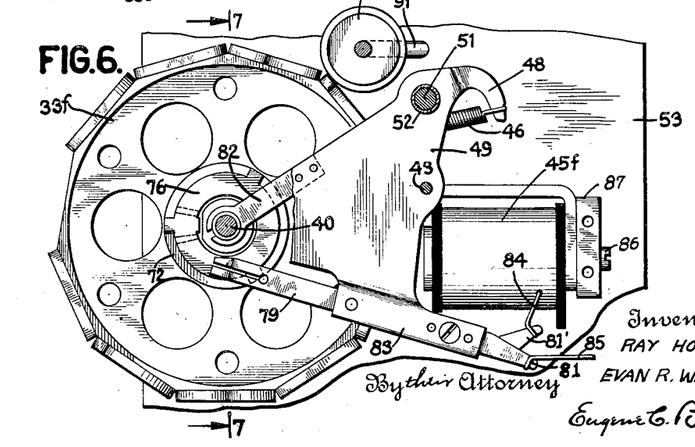
Figure 6 is a side view of the opposite side of the type wheel from that shown in Figure 3.
Figure 7:
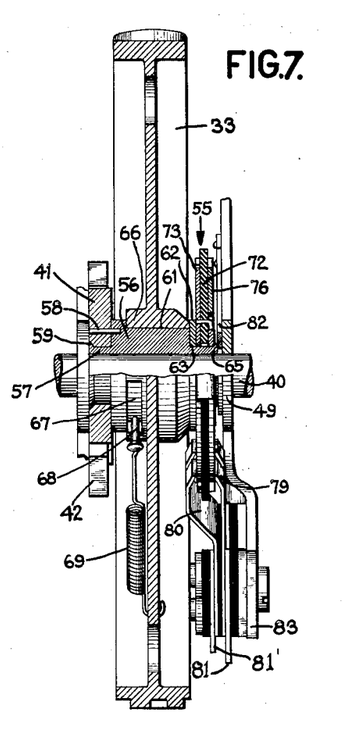
Figure 7 is a vertical sectional view on the line 7—7 of Figure 6.

Similarly, the type wheels when once set into motion possess considerable momentum and, therefore, in order to prevent the pawl 42 from being thrown out of engagement therewith after the last operating impulse and thus to eliminate the type wheels being carried beyond the printing position, the teeth of the ratchet wheel 41 are so shaped with relation to the configuration of the pawl that, when the pawl is in the normal position corresponding to the end of each impulse, as shown in Figure 3 the force due to momentum, exerted by the ratchet wheel against the lower pallet of the pawl is in substantial alignment with the end of the pawl and the pivot point 43, as indicated by the small arrow 71, the surface of engagement of the pallet and ratchet wheel being substantially normal to the line connecting surface of engagement with the pivot point of the pawl. Consequently, the momentum of the type wheel communicated through the star wheel is ineffective to force the anchor or pawl out of engagement with the ratchet wheel and the type wheel is positively stopped in the correct position. The teeth of the ratchet wheel are similarly shaped and related to the upper arm of the pawl, as shown in Figure 11.

Obviously, the type wheels may be set in printing position by rotating the same from the last set position until the proper character is moved into printing position or the printing wheels may be restored before each printing operation to a predetermined or unison position, as for instance with the blank portion thereof in printing position, and then set in the correct printing position by transmitting to their operating magnets, impulses corresponding in number to the digit which it is desired to print. We prefer to employ the latter method of operation in order to bring the same into accord with the method employed for operating the direct reading indicator units, so that the printing mechanism may be operated in combination with an indicator board or from the same signals employed for operating the indicator board.

Figure 10:
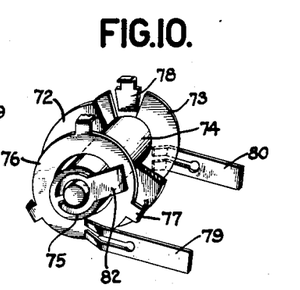
Figure 10 is an exploded view of the commutator employed in connection with each type wheel for controlling the application to and removal of ground from the windings of the type wheel operating magnets.

The commutator 55 provides the means for controlling the restoration of the printing wheels to such predetermined or unison position prior to transmitting the impulses corresponding to the new quotation. Referring to Figure 10 which is an exploded view of the commutator it comprises an insulating disc 72 having a disc shaped metallic contact member 73 mounted upon one side thereof, the contact member 73 having a tubular hub 74 extending through the insulating disc and being riveted over as shown at 75 against the opposite side of the insulating disc to secure these parts together. An annular metallic contact member 76 is disposed at the opposite side of the insulating disc 72 from the contact member 73 and is secured to the disc by tabs 77 which extend over the edge of the disc. The contact member 73 has a sector cut away and the contact member 76 has a sector 78 disposed within the cut away portion of the member 73. The sector 78 and annular contact member 76 are insulated from the contact 73 and each of these contacts are provided with brushes 79 and 80 respectively. The commutator is mounted upon the sleeve 56 in such angular position that the sector 78 is engaged by the brush 80 when the blank portion of the type wheel is in the printing position.

The contact member 73 is grounded, as by means of a contact strip 82. The brushes 79 and 80 are mounted upon an offset portion 83 of the bracket 49 and are provided with terminal lugs 81 and 81' for making the electrical connections thereto. Lug 81' is connected by conductor 84 to one terminal of the operating magnet, the opposite terminal of the magnet being connected to the line as will appear fully hereinafter and lug 81 is connected, as by conductor 85 to a contact of the selecting mechanism (not shown) whereby it may be selectively grounded.

The operation of the commutator is as follows: When it is desired to restore the printing wheels to their predetermined initial position prior to making a new setting, ten restoration impulses are supplied to the operating magnets through the selecting apparatus, as fully described in the aforesaid Hoover application, the operating circuit for the magnet 45 being completed through the brush 80 and the grounded contact 73.

Assuming for instance, that the type wheel was set to print the character for the numeral 6, the first five impulses would step the type wheel around to bring the numerals 7, 8, 9, 0, and the blank portion thereof, successively into the printing position. At the moment the blank portion of the wheel reaches the printing position, the brush 80 engages sector 78 of the commutator which, as stated before, is insulated from the grounded contact 73. The segment 76 of the commutator is ungrounded at the selecting mechanism, at this time and consequently the circuit to the magnet is not completed during the transmission of the remaining five restoration impulses. The type wheel therefore remains set in its unison or blank position at the end of the transmission of the restoration impulses.

The ten unison or restoration impulses enable the type wheel to be set in blank position in the most unfavorable previous setting thereof, that is, with the numeral 1 in printing position.

At the conclusion of the restoration impulses, the selecting mechanism operates to apply a ground through the brush 79 to the sector 78. The required number of impulses for stepping the type wheel into the new position may then be transmitted, the grounded circuit of magnet being completed through the sector 78 and brush 79. As soon as the first impulse is received the commutator rotates to place the contact 73 in engagement with the brush 80 so as to restore the normal ground to the magnet, the actuating ground at the same time being removed from the sector 78 in readiness for the next restoration cycle. The operating circuit connections for the printing unit and the direct indicators which may be associated therewith are shown more fully in Figure 18 and will later be described with particular reference thereto.

The magnets 45h, 45t, 45m and 45f are secured by screws 86 to a bar 87 extending crosswise between the plates 53 and 54.

Separate inking rollers 90, mounted upon a crank shaft 91, bearing in the side plates 53 and 54, rest by weight, upon each type wheel. Since the type wheels rotate to each printing position through the unison position, they make an average of one complete revolution for each quotation printed. In certain instances, where the wheel is set to print a number of high digit, as nine, and the succeeding quotation involves the printing of a number of low digit, as one, the low digit character will not be carried past the inking roller in moving into printing position and therefore will not be inked immediately preceding printing. Two successive occurrences of this condition cannot occur, however, without a complete revolution of the type wheel and complete inking thereof.

Prior to the opening of the exchange, each morning for the transaction of business, a number of groups of unison or restoration signals are transmitted for each stock and a thorough inking of the type wheels thus effected at this time. In the case of those stocks or items which are active, the type wheels will make successive revolutions past the inking rollers at frequent intervals. In the case of the less active stocks, a considerable period may elapse between each operation of the printing wheels. Ordinarily the character to be printed will be inked just preceding the printing operation but in order to provide for those occasions referred to, in which two successive printings occur a long time apart, without an intermediate inking of the character to be printed, a slow drying ink should be employed. Inks are available and in general use on stock quotation tickers which will remain moist on the type wheel under favorable atmospheric conditions for several days and which under the most severe conditions met in operation, will remain sufficiently moist to make a good impression, for several hours. An adequate inking of the type wheels is therefore assured at all times.

It will be readily understood that in printing successive quotations of the same stock it will be unnecessary to reset the type wheels for the entire hundreds, tens, units, and fractions values of the quotation but only for those values in which changes occur since the last preceding quotation. The remaining type wheels may be left in their last set position or may be returned to blank or unison position, thereby printing only the changes occurring in the quotation. The hundreds, tens, units and fractions digits will always be printed in the same relative position transversely of the paper tape and when a single digit as the fractions or units is printed alone the column or positioning of the printing will indicate ordinarily whether the printed character represents a units or fractions value of the quotation. However, in order to avoid confusion and to definitely indicate fractions values from units values irrespective of position on the tape, we prefer to print the fractions in a distinctive manner either as to color or form or both.

The provision of individual inking rollers 90 for each type wheel and the use of individual type wheels for each digit of the quotation permits such distinctive color to be employed for the fractions. We prefer to employ red ink for the fractions inking roller and black or other differently colored ink for the units, tens and hundreds rollers.

Figures 17, 19:
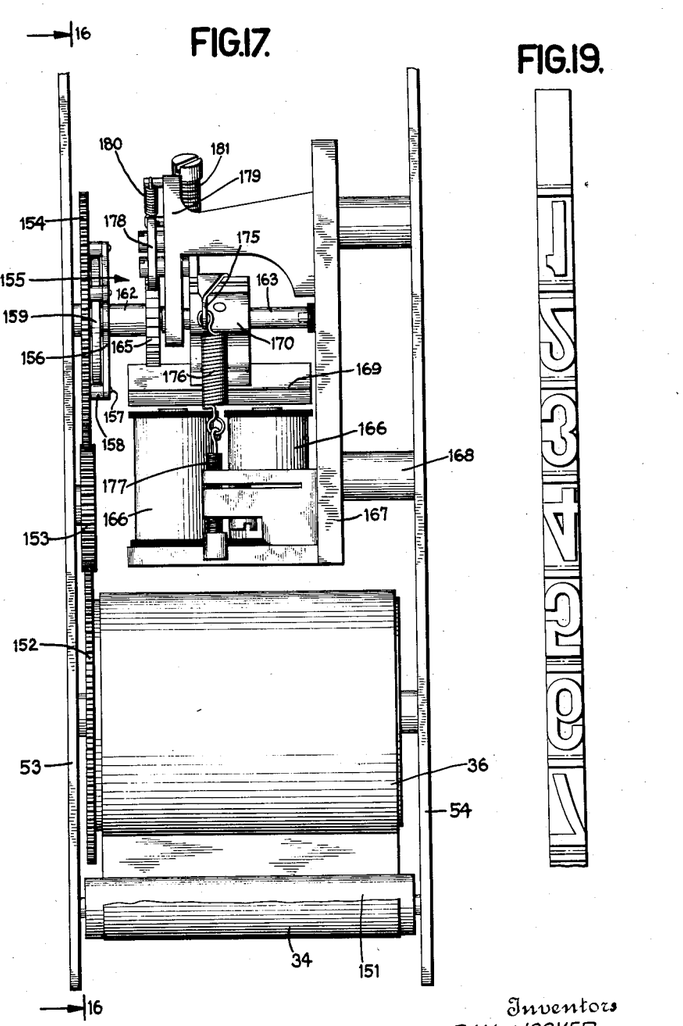
Figure 17 is a front elevation of the paper take-up mechanism.
Figure 19 shows developed, one form which the fractions type wheel characters may take.

As an alternative or in addition to the distinctive color of the fractions printed characters, a different style of character may be employed or the fractions characters may be preceded by a decimal point as shown in Figure 1 or underlined with a bar as shown in Figure 19.

The paper strip 34 upon which the printing is recorded is of a width sufficient to extend across the face of the four type wheels and extends from the roll 35, mounted between the side plates 53 and 54, over a metering roller 95, thence beneath the type wheels and around an idler roller 96 and through an aperture 97 to the front of the indicator board panel 20. The idler roller 96 is mounted between offset lugs 98 at the ends of a plate 99 which extends crosswise between the side plates 53 and 54.

Individual platens or hammers 100h, 100t, 100u and 100f are positioned beneath each type wheel and have stems 101 pivoted thereto by pins 102, the stems having vertical sliding engagement in apertures in the cross plate 99. The heads of the platens normally rest on the plate 99 and the lower ends of the stems are disposed directly above a universal platen actuating bar 103 pivoted centrally on a pin 104 in the forked upper end of the plunger 105 of a printing solenoid 106. The upward movement of the plunger 105 is limited by an adjustable nut 107 on the lower end thereof and is returned to its lower position after each printing stroke by a coiled spring 108 secured to the solenoid bracket 109 and to an extension 110 of the pivot pin 104. The solenoid is mounted between the arms of the U-shaped bracket 109 which in turn is mounted by screws 112 on a plate 113 extending crosswise between the side plates 53 and 54.

After the type wheels have been set in printing position, the solenoid 106 is energized, as will hereinafter appear, to raise the universal bar 103 against the platen stems, to move the platens upwardly against the paper 34 and force the same into contact with the type wheels. The pivoted connection between the plunger 105 and the universal bar 103 compensates for any inaccuracy in the construction of the actuating mechanism and insures all of the platens making a complete stroke. The pivoted mounting of the platens on the stems compensates for slight irregularities in the setting of the type wheel or in the location of the characters thereon.

Figure 16:
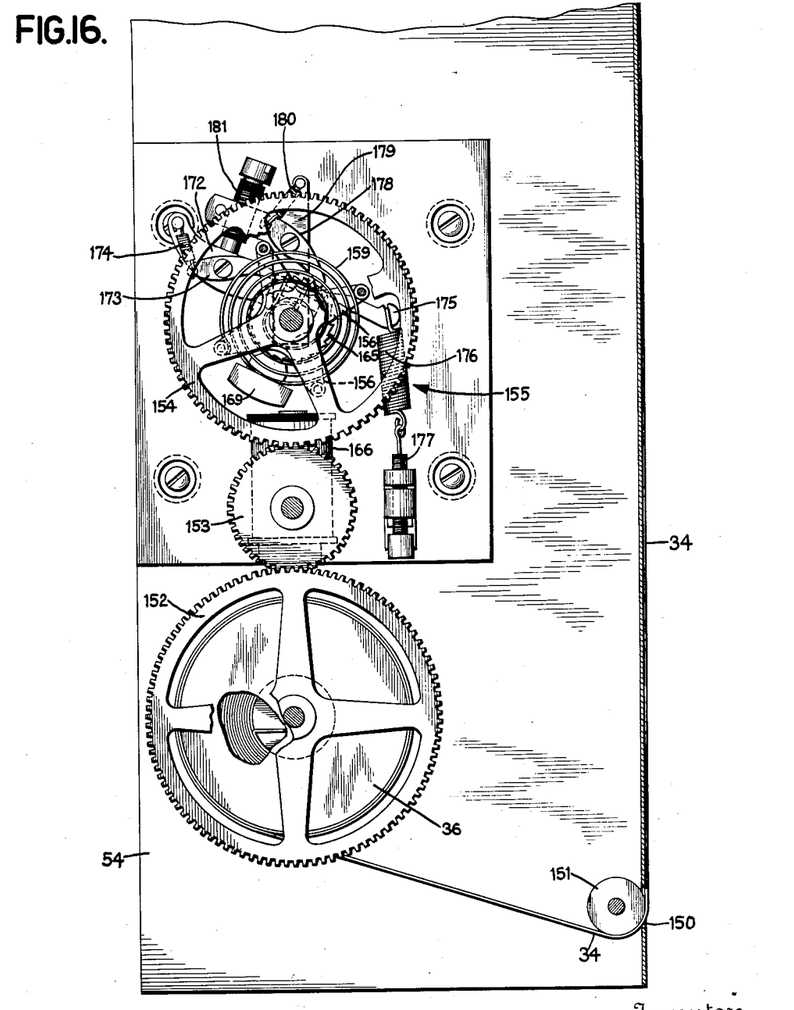
Figure 16 is a side elevation of the paper take-up mechanism, viewed on the line 16—16 of Figure 17.

The paper is maintained under constant tension by the take up mechanism disposed at the lower end of the board, as will appear from a detailed description of Figures 16 and 17, and the paper is fed forward, after each printing operation, a distance sufficient to bring the printed quotation into view at the front of the board.

The paper is gripped between knurled portion 114 of the metering roller 95 and knurled rollers 115 positioned adjacent each margin of the paper. The rollers 115 are mounted on the ends of levers 116 pivoted on stub shafts 117 threaded into the side plates 53 and 54 respectively, and each wheel is pressed against the metering roller by a spring 118 secured to a pin 119 on the hub of each of the levers 116 and to a pin 120 protruding from the adjacent side plate.

The metering roller shaft 95 is pivoted on pin bearings 122 in the side plates 53 and 54 and is retained against rotation under the tension of the paper by a stop wheel 123 having a shoulder 124 engaging a stop arm 125 pivoted on a pin 126 threaded into a bracket 127 suspended from the cross plate 99. The stop arm is normally held in engagement with the shoulder of the stop wheel by a spring 128 encircling the pivot 126 and having one end 129 engaging the lower end of the stop arm. A latch 131, pivoted at 132 in a recess in the cross plate 99, is pressed upwardly by the opposite end 133 of the spring 128, against a pin 134 carried by the stop arm 125. The latch is notched at 135 to engage the pin 134 when the stop arm is moved out of engagement with the stop wheel.

A lever 136, pivoted at 137 to the bracket 127, has a forked end 138 in which the end of the pin 104 engages to rock the lever each time the plunger 105 operates to print a quotation. The lever 136 carries a dog 140 pivoted thereto at 141, an end of the dog normally extending over the shoulder 142 of the stop arm 125.

Figure 8:
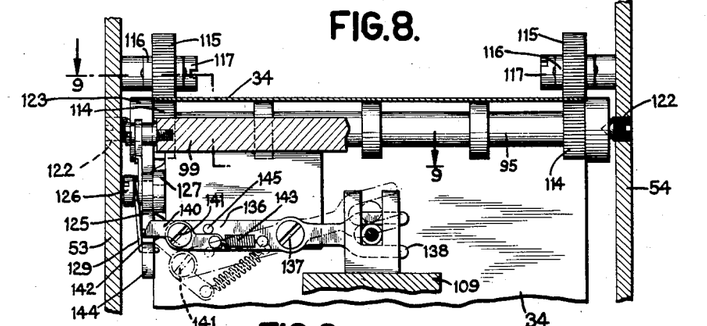
Figure 8 is a vertical sectional view of the paper feeding and metering device taken on the line 8—8 of Figure 3.
Figure 9:
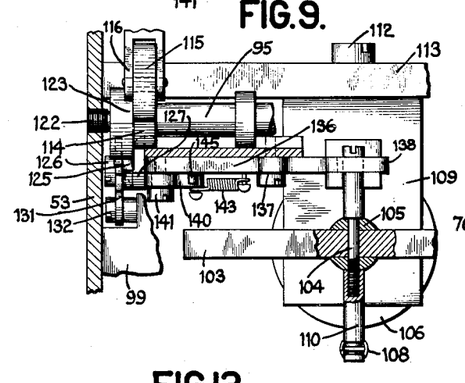
Figure 9 is a horizontal sectional view of the paper metering mechanism on the line 9—9 of Figure 8.

Upon upward movement of the solenoid plunger, the left end (Figure 8) of the lever 136 is swung downwardly, the dog 140 engaging the shoulder 142 of the stop arm, and pivoting to the position shown in dotted lines in Figure 8 against the action of a coiled spring 143 until the shoulder 142 is cleared and then moving downward below the inclined lower edge 144 of the stop arm.

Upon the return or downward stroke of the plunger, the left end of the lever, in swinging up, carries the dog into contact with the inclined face of the stop arm and reacting against the stop pin 145, throws the stop arm out of engagement with the stop wheel. Pin 134 engaging in notch 135 of the latch 131 holds the stop arm withdrawn. The metering roller shaft 95 is thus freed to rotate, under the tension of the paper 34, in a clockwise direction, as seen in Figure 3. During the first part of this rotation the eccentric portion of the stop wheel engages the free end of the latch 131, depresses it and permits the stop arm to return under the action of spring 123 into position to again stop the metering roller shaft after it has made one revolution.

The diameter of the metering roller is such as to permit the printed portion of the paper to be drawn into view at the front of the board.

The paper passes down the face of the board and through an aperture 150 at the bottom thereof and around an idler roller 151 to the take-up roller 36, mounted between the side plates 53 and 54. A gear 152 fixed to the take-up roller meshes with an idler gear 153, meshing in turn with a gear 154 forming part of a winding device, generally indicated at 155.

A spider 156 secured to the gear 154 by rivets 157 and spacers 158, forms a housing for a spiral spring 159, one end of which is secured to the housing at 160 and the opposite end of which is secured at 161 to a sleeve 162 loose upon the shaft 163. The sleeve 162 has a ratchet wheel 165 fixed thereto so that upon rotation of the ratchet wheel, the spring 159 is wound up to apply tension to the take-up roller 36 through the gears 152, 153 and 154. An electro-magnet 166 is mounted upon a bracket 167 carried by the side plate 54 by posts 168, and has an armature 169 carried by a lever 170 pivoted on the shaft 163. The lever 170 has an extension 172 upon which is pivoted a pawl 173 held in engagement with the ratchet wheel by a spring 174. The lever 170 has an opposite extension 175 to which a spiral spring 176 is secured, the opposite end of the spring being connected to a tension adjusting screw 177 threaded in part of the bracket 167.

A holding pawl 178 carried by an extension 179 of the bracket 167 is held in engagement with the ratchet wheel by a spring 180. An adjustable stop screw 181, for the armature lever extension 172 is also carried by one arm of the bracket member 179.

The operation of the winding device is as follows: Upon energizing the magnet 166, the armature 169 is swung counter clockwise, as viewed in Figure 16, against the action of the spring 176, thus moving the pawl 173 backwards into engagement with the succeeding tooth of the ratchet wheel. Upon release of the magnet, the spring 176 swings the armature lever back in a clockwise direction and causes the ratchet wheel to move around the distance of one tooth, to wind up the spiral spring 159. By subjecting the magnet 166 to a number of successive impulses the spring 159 may be wound up until it overcomes tension of the retractile spring 176 and thereby prevents the return of the armature to its open or unoperated position. Further impulse transmitted to the magnet 166 will not effect further winding of the spiral spring.

The spiral spring 159 maintains a tension on the take-up roller 36 and as the paper is released at the metering roller 95 after each printing operation, it is taken up by the take-up roller.

The subsequent operation of the magnet 166 again winds up the spiral spring until its force again overbalances that of the retractile spring 176.

Figure 13:
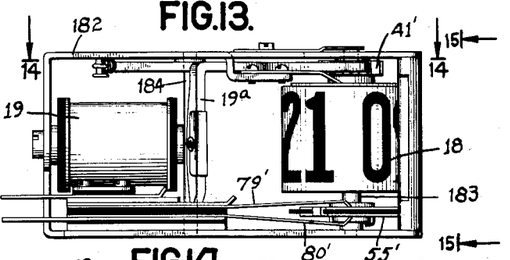
Figure 13 is a side elevation of a direct reading indicator unit which may be employed in combination with the printing unit.
Figure 14:
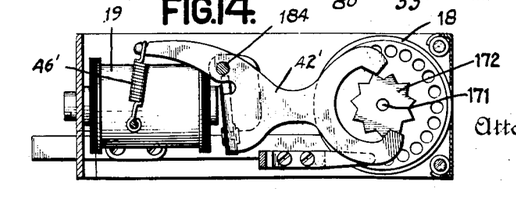
Figure 14 is a horizontal sectional view of the indicator unit on the line 14—14 of Figure 13.
Figure 15:
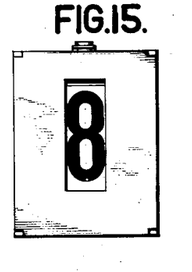
Figure 15 is a front view of the indicator unit as seen on the line 15—15 of Figure 13.

Reference will now be had to Figures 13, 14 and 15 which show the construction of the indicator units 22 which may be employed in conjunction with the printing unit. The indicator unit comprises a rectangular casing 182 having the drum 18 bearing the characters 1 to 9, 0 and a blank portion, mounted on a vertical shaft 183 bearing in the frame 182. The drum has a star or ratchet wheel 41' secured to the upper side thereof, and a commutator 55', similar to commutator 55 of the printing unit, fixed to the underside. The magnet 19 mounted within the casing has an armature 19a, pivoted on a vertical shaft 184, the armature having a right angled extension terminating in the two armed pawl 42' which engages the star wheel to step the drum around. A spring 46' moves the pawl in the opposite direction. A pair of brushes 79' and 80' engage the opposite sides of the commutator to control the application of a ground to the winding of the magnet 19. The casing has an aperture or window in its front side to cause a single character to be exposed at a time.

Figure 18:
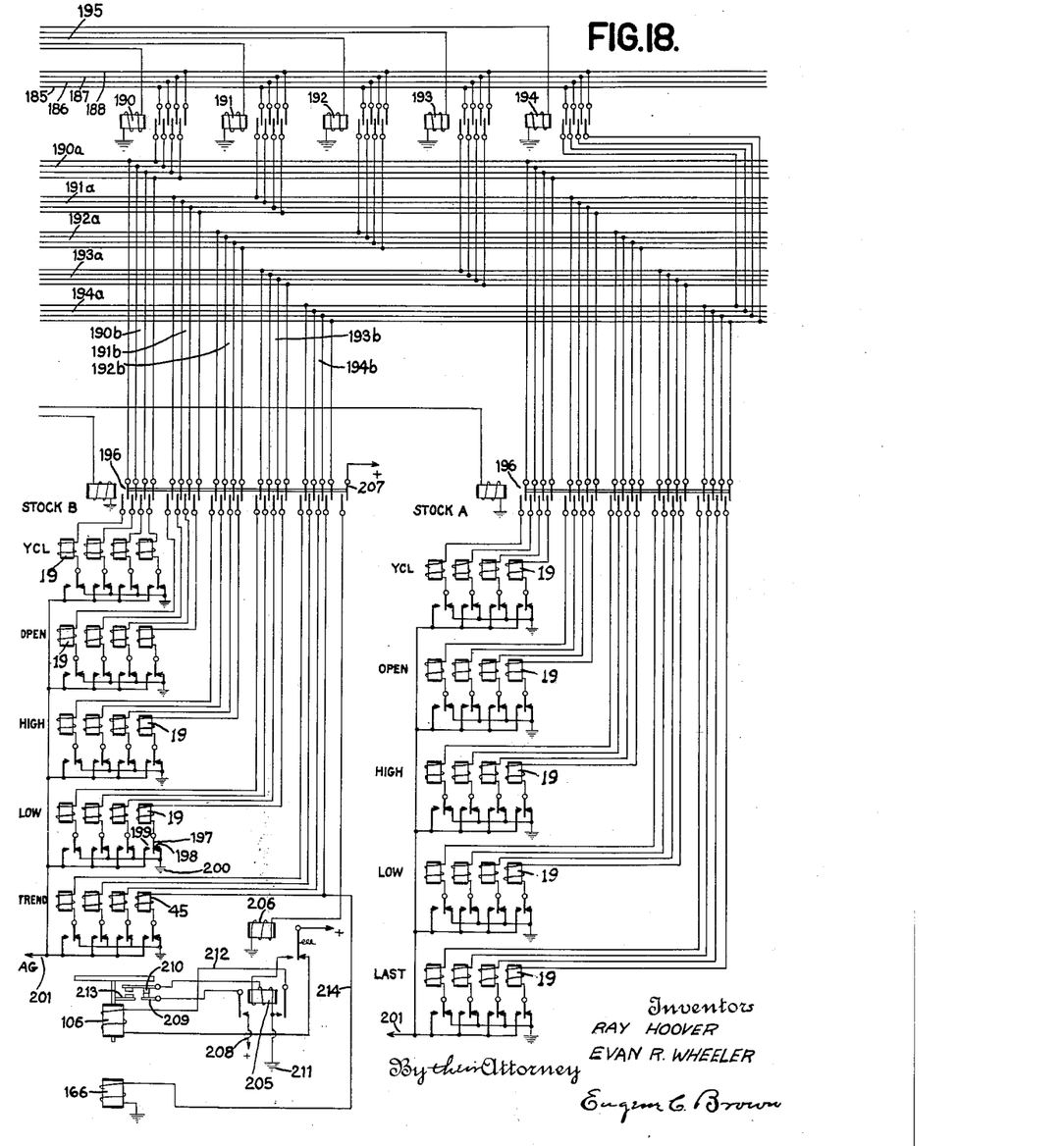
Figure 18 is a diagrammatic illustration of the electrical equipment and control circuits for the indicator units of a stock or item in which the "last" quotation is posted, in one instance by means of a printing unit and in the other instance by means of direct reading indicators.

In Figure 18 we have shown the circuit connections for operating the quotation board units of two stocks or items B and A. Stock B comprises four groups of indicators, the operating magnets 19 only of which are shown, corresponding to the "yesterday's close", "open", "high" and "low" quotations, and a printing unit for printing the last quotation or trend, the printing wheel operating magnets 45 only being shown. The board mechanism for stock A is similar to that of stock B except that direct reading indicator units are employed for posting the "last" quotation in place of the printing unit.

The mechanism and system by which the particular stocks and the range, that is whether "yesterday's close", "open", "high", "low" or "last" quotations, to be posted, are selected, forms no part of the present invention, being fully disclosed in said aforesaid application of R. Hoover. A portion only of the operating circuit is shown for the purpose of explanation.

The four channels of communication over which the signal impulses for operating the hundreds, tens, units and fractions magnets are represented by the conductors 185, 186, 187 and 188 respectively. Each of these conductors extend in multiple to the contacts of a group of range relays 190, 191, 192, 193 and 194, which determine which group of magnets 19 or 45 of any particular stock are to be operated. The range relays are controlled through the selecting mechanism (not shown) through conductors 195. The opposite contacts of each of the range relays 190 to 194 are connected to groups of conductors 190a, 191a, 192a, 193a, and 194a common to the entire board and from which multiple connections 190b, 191b, 192b, 193b and 194b are made to the multicontact stock relay 196 of each stock. The stock relays are also selectively controlled through the selecting mechanism, to determine the particular stock, the magnets 19 or 45 of which are to be operated. The connections 190b to 194b are continued through the contacts of the relay 196 to the windings of the magnets of the "yesterday's close", "open", "high", "low" and "last" indicators or printing units.

The switch tongues 197 and associated contacts 198 and 199 represent diagrammatically the commutator 55 or 55' and serves when on contact 198 to apply the normal ground 200 to the magnet windings, the tongue reversing to contact 199 when the indicator drums or printing wheels are in unison or blank position, to remove the normal ground and connect the magnet windings to the ground control contacts of the selecting mechanism through conductor 201.

Upon closing of one of the stock relays 196, as that for stock B, and one of the range relays, as relay 194, the four signal conductors 185 to 188 are connected directly to the windings of the type wheel magnets 45 and upon transmission of the ten unison or restoration impulses over the lines, the type wheels will be moved to unison or blank position and held there by removal of the normal ground 200 from the magnet windings. Thereafter, and before the signals corresponding to the new quotation are transmitted over the lines 185 to 188, a ground is applied to the conductor 201 to cause the magnets to respond to the subsequent signal impulses. If the new quotation to be printed is 147⅝, for instance, one impulse would be transmitted over line 185 to set the hundreds printing wheel, four over line 186, seven over line 187 and five over line 188 to set the tens, units and fractions wheels respectively, in readiness for the operation of the printing solenoid 106.

It will be understood that by operating two or more of the range relays, as the "last" and "high" relays 194 and 192 that the group of "high" indicators and the printing unit may be operated simultaneously.

The control circuit for the solenoid 106 includes a locking relay 205 and a control relay 206. The winding of relay 206 is grounded at one end and connected to one contact 207 of the stock relay 196, the cooperating contact having a source of potential applied thereto. Upon closing of the stock relay 196 to select a particular stock, relay 206 picks up and applies battery through its front contact to the grounded winding of locking relay 205 which then operates to complete a locking circuit from battery 208, left hand front contact of relay 205, and contacts 209 and 210 to the mid-point of the winding of relay 205. A circuit is also prepared for the solenoid 106 from the ground 211, right hand contact of relay 205 and conductor 212 to one terminal of the solenoid 106, the circuit being open at the back contact of relay 206.

This circuit condition is established upon selection of the stock and prior to transmitting the restoration and quotation signal impulses. At the completion of the transmission of these signals, the stock relay 196 releases and in so doing causes the tongue of relay 206 to drop back on its back contact, thus completing the circuit to the solenoid 106 and causing the same to operate to complete the printing operation. The upward movement of the plunger, through extension 213 opens the contacts 209 and 210 thus interrupting the locking circuit of relay 205 and the downward stroke of the solenoid plunger, releases the metering roller 95 to feed the printed quotation into view. The contacts 209 and 210 are shown in Figure 4.

The winding relay 166 of the take-up mechanism may be operated directly from the restoration and quotation signal impulses and for this purpose, its grounded winding may be connected by a conductor 214 (Figure 18) in parallel with the fractions magnet.

The exposed portion of the paper at the front of the board may be of any desired length and preferably should show from ten to twenty quotations. However, at times a broker or one of his customers may desire to examine the quotations on a portion of the tape which has already been wound in the take-up roller and this may be accomplished by merely grasping the paper and pulling it outwardly at the front of the board. The spiral spring 159 is tightened up by this action and serves to rewind the paper on the take-up roller when the paper is released.

At the time the paper is held withdrawn from the take-up roller, the tension on the paper is released at the metering roller 95 and should a printing occur at this time it would not feed out into view. The latch 131 serves to hold the stop arm 125 out of engagement with the stop wheel after the printing so that when tension is restored to the paper, the metering roller is free to make a revolution and feed the quotation into view.

It is obvious of course that the metering roller may be positively driven so as to rotate one revolution each time the stop arm is withdrawn from engagement with the stop wheel, as through a slip clutch or spring motor. Furthermore, the winding magnet 166 may be supplied with impulses from a purely local impulse generator instead of using the signal impulses or a winding motor individual to each printing unit or common to a number of units, may be employed.

It will be noted that a printing unit has been produced in which the type wheels may be set simultaneously or in succession and in which the printing from all four type wheels is accomplished in a single operation of the platen. The printing and paper feeding is effected automatically without the transmission of any special or extra signals other than those required to effect the stock selection and no changes are required in the selecting and control apparatus and circuits employed for quotation boards employing indicator units, other than the addition of an extra contact to the stock relay. The printing apparatus is rapid in operation and will keep pace with the indicator units and operates on the same signals whereby printing quotation boards, indicator quotation boards or combinations of indicator and printing quotation boards may be operated in the same transmitting system.

Figure 20:
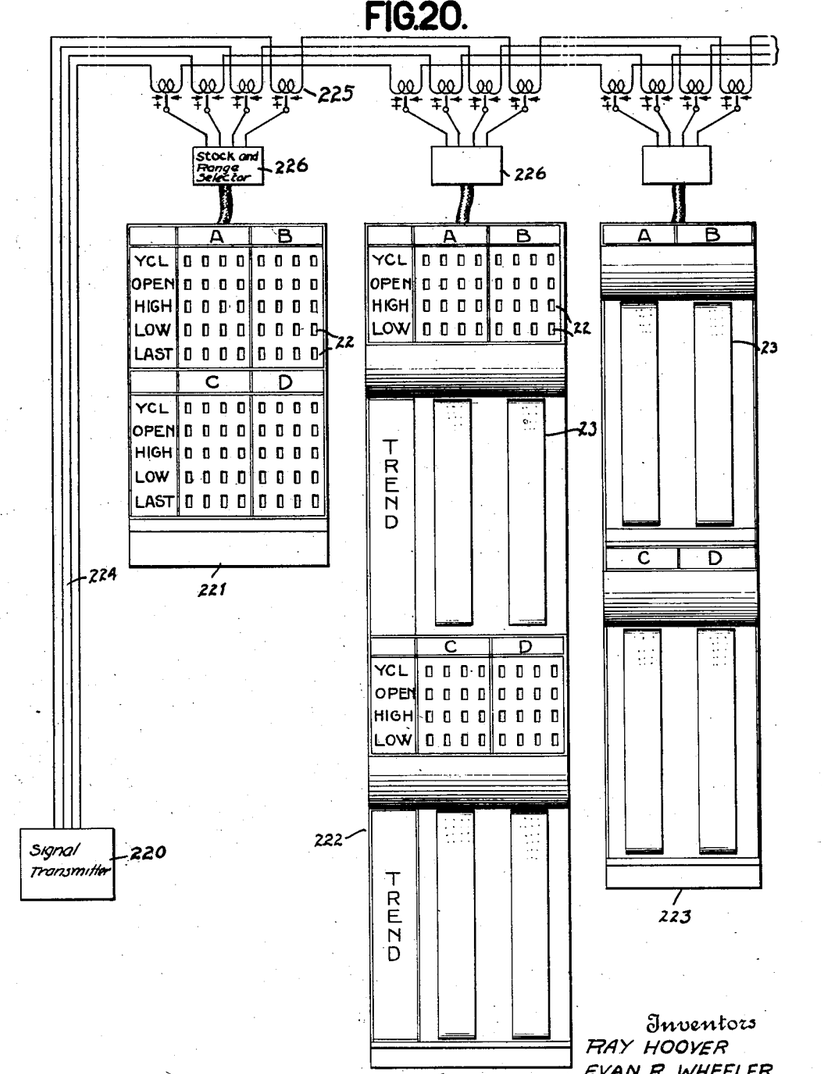
Figure 20 is a somewhat diagrammatic view of a remote control system for a plurality of boards of different types.

In Figure 20 we have illustrated a quotation board system comprising transmitting station equipment 220 located at the stock exchange or other central point and a number of quotation boards 221, 222 and 223, which may be located in different brokers' offices. Each quotation board provides facilities for posting four stocks, A, B, C, and D. Board 221 uses direct reading indicators 22 for the entire range of quotations, that is, for the "yesterday's close", "open", "high", "low", and "last" quotation. Board 222 employs direct reading indicators 22 for the "yesterday's close", "open", "high", and "low" quotations and a printing unit 23 for posting the trend of the market. Board 223 dispenses with all direct reading indicators and employs only printing units 23 for each stock for posting the trend.

Each board is operated from the common transmitting equipment 220 over the same group of conductors 224, four conductors being employed to control the hundreds, tens, units, and fractions indicators or type wheels. At each quotation board a relay 225 is included in series with each of the conductors 224 and the transmitted signals are thus repeated to the stock and range selecting mechanism 226 which controls the quotation board mechanism.

It is possible thus, to transmit a group of signals over the lines 224 representative, for instance, of the "last" and "high" quotation of stock A and to simultaneously operate all of the boards therefrom, the "last" and "high" direct reading indicators of stock A operating at board 221, the "high" indicators and printing unit operating at board 222, and the printing unit alone operating at board 223. Various other arrangements and combinations of printing units and direct reading indicators may be used. For instance, all three arrangements or any two thereof shown in Figure 20 may be used with a single board for different stocks or items. The transmitting equipment 220 may be of the construction described in the aforesaid application of R. Steeneck and the stock and range selection mechanism 226 may be of the form shown in the Hoover application referred to above.

It will be noted that the printing mechanism for each item forms a complete unit, all of the mechanism being carried by the side plates 53 and 54. Consequently a single printing unit of this nature or a small group of units may be utilized independently of the main quotation board, as for instance upon a broker's or executive's desk or in a private office, so as to print the quotations of a selected stock or group of stocks or commodities, in which case the type wheels may be of a small size so as to print upon a narrow tape, similar to the usual stock ticker tape. We have shown the tape arranged so that the printing occurs transversely thereof but it is to be understood that it may be arranged to travel axially of the group of type wheels so as to print the quotations longitudinally thereof. For instance, the printing unit may be connected to the control panel or selecting cabinet through cord circuits provided with plug and jack connections in the manner shown in the patent to Daine, No. 1,658,516, granted February 7, 1928. By means of such connections a single unit or group of units may be located in different offices more or less remote from the selecting cabinet and the circuits for individual stocks may be extended to such offices from the selecting mechanism. By thus locating the printing units showing the trend of particular stocks remote from the main quotation board on which a large number of direct reading indicators are concentrated, the main board is not unduly enlarged. Moreover, if desired, the trend of certain stocks may be projected from the printed tapes on to suitable screens associated with the main board in the manner now prevalent for stock ticker tape.

Many other changes and modifications of the structure and arrangements will occur to those skilled in the art and therefore we do not desire to be restricted to the specific construction and arrangements shown and described.

What we claim is:

1. A type wheel, means for rotating said type wheel into printing position, comprising a ratchet wheel, a pivoted pawl engaging said ratchet wheel to rotate the same, a portion of said ratchet wheel and pawl at the end of each driving stroke being substantially normal to the line connecting the point of engagement of the pawl and the ratchet wheel with the pivot point of said pawl.

2. A type wheel, means for rotating said type wheel into printing position comprising a ratchet wheel, a pivoted pawl having pallets alternately engaging the opposite sides of said ratchet wheel to rotate the same, the engaging portions of each of said pallets with said ratchet wheel at the end of the movement of the pawl in each direction being substantially normal to the line connecting the point of engagement of the pawl and ratchet wheel with the pivot point of said pawl.

3. In a printing apparatus a plurality of type wheels mounted in axial alinement, means for rotating said type wheels into printing position, a platen for each of said wheels across which paper extends, a stem for each platen pivotally connected thereto, a universal bar upon which said stems rest, and an actuating member for said bar pivotally connected thereto.

4. In a printing apparatus a plurality of type wheels mounted in axial alignment, means for rotating said wheels into printing position, a platen for each of said wheels across which paper extends, a universal bar extending adjacent each of said platens for operating the same simultaneously, and an actuating member for said bar pivotally connected thereto.

5. In a printing apparatus a plurality of type wheels mounted in axial alignment, means for rotating said wheels into printing position, a platen for each of said wheels across which paper extends, a stem for each platen pivotally connected thereto, a universal bar upon which said stems rest and a solenoid having a plunger pivotally connected to said universal bar.

6. In a printing apparatus, a plurality of type wheels mounted in axial alignment, means for rotating said wheels into printing position, a platen for each of said wheels across which paper extends, stems for said platens, a guide through which said stems extend, and a common actuating bar engaging said stems to operate said platens substantially simultaneously.

7. In a printing apparatus, a plurality of type wheels mounted in axial alignment, means for rotating said wheels into printing position, a platen for each of said wheels across which paper extends, stems for said platens pivotally connected thereto, means for moving said stems to force the platens and the paper against the type wheel to effect printing, a universal bar extending adjacent each of said stems for operating the platens simultaneously, and an actuating member for said bar pivotally connected thereto.

8. In a printing apparatus for an item to be posted, a plurality of type wheels including a type wheel for each digit of said item, means for rotating the type wheels into printing position with the desired printing portion of all of said type wheels in substantially the same plane, a platen for each of said type wheels across which paper extends, a stem for each of said platens pivotally connected thereto and a common actuator means for engaging said stems to force the platens against the type wheels to effect printing.

9. In a printing device an impression making element, a platen across which paper may be passed, an actuator for said platen, a metering roller for said paper, means normally restraining said metering roller against rotation, and means operated by the movement of said actuator for causing said metering roller to advance the paper a predetermined distance.

10. In a printing device an impression making element, a platen across which paper may be passed, an actuator for said platen, a metering roller for said paper, driving means for said metering roller, means normally restraining said metering roller against rotation, and means operated by the movement of said actuator for releasing the restraining means to permit said metering roller to rotate a predetermined distance.

11. In a printing device an impression making element, a platen across which paper may be passed, an actuator for said platen, a metering roller for said paper, means for applying tension to said paper, means co-operating with said metering roller to restrain said paper against movement, and means operated by the movement of said actuator for releasing the restraining means to permit said paper to move forward a predetermined distance.

12. In a printing device an impression making element, a platen across which paper may be passed, an actuator for said platen, a metering roller for said paper, a stop wheel carried by said roller, a stop arm normally engaging said stop wheel to restrain said roller against rotation, and a trip member operated by the movement of said actuator, after effecting printing, to move said stop arm out of engagement with said stop wheel to permit said roller to rotate a predetermined distance, whereby said paper is fed across said platen.

13. A printing mechanism comprising a plurality of type wheels, a platen across which paper may be passed, a paper feeding mechanism, a separate take-up roller, a motor for said take-up roller for applying tension to said paper independently of said feeding mechanism, and means for operating said feeding mechanism following each printing operation to advance said paper a predetermined distance.

14. A printing mechanism comprising a plurality of type wheels, a paper feeding mechanism, a take-up roller therefor, a spring for said take-up roller for applying tension to the paper, a winding mechanism for said spring actuated by electrical impulses, means responsive to succession of electrical impulses for moving said type wheels into printing position, means for applying signal impulses to said type wheel operating mechanism, and means for applying certain of said signal impulses to said winding mechanism.

15. In a quotation board apparatus for posting information concerning a plurality of items, a selecting relay for each item, a printing mechanism for each item having a plurality of type wheels, electromagnetic means for moving said type wheels, a control circuit for said electromagnetic means closed upon operation of said selecting relay, a printing electromagnetic device, means for preparing a circuit to said printing device upon operation of said selecting relay, and means for completing said relay circuit upon release of said selecting relay.

16. In a quotation board apparatus for posting information concerning a plurality of items, a selecting relay for each item, a printing mechanism for each item having a plurality of type wheels, a platen, an electromagnetic device for actuating said platen, means for preparing a circuit to said electromagnetic device upon operation of said selecting relay, and means for completing said circuit upon release of said selecting relay.

17. In a quotation board apparatus for posting information concerning a plurality of items, a selecting relay for each item, a printing mechanism for each item having a plurality of type wheels, actuating means for said type wheels, an operating circuit therefor, said selecting relay on operating completing said circuit to enable said type wheels to be moved into printing position, and means acting upon the release of said relay to effect printing.

18. In a quotation board apparatus for posting information concerning a plurality of items, a plurality of type wheels for each item, actuating means for said wheels responsive to electric signals to move said wheels to printing position, selecting means for completing a circuit to said type wheel actuating means, and means controlled by said selecting means for effecting printing from said type wheels.

19. In a quotation board apparatus for posting information concerning a plurality of items, a plurality of type wheels for each item, actuating means for said wheels responsive to electric signals to move said wheels to printing position, a printing platen, electromagnetic means for operating the same to effect printing, a circuit for said electromagnetic means, means for completing a portion of said circuit prior to transmission of signals to said type wheel actuating means, means for completing the remainder of said circuit, after the termination of the transmission of signals to said type wheel actuating means, to operate said electromagnetic device, and means acting upon such operation to interrupt said circuit.

20. In a quotation board apparatus for posting information concerning a plurality of items, a plurality of type wheels for each item, actuating means for said wheels responsive to electric signals to move said wheels to printing position, signal circuits, means for selectively completing said signal circuits to said type wheel actuating means, a printing platen, electromagnetic means for operating the same to effect printing, a circuit for said electromagnetic means, means for completing a portion of said circuit prior to the transmission of signals to said type wheel actuating means, and means for completing the remainder of said circuit after the termination of the transmission of said signals.

21. In a quotation board apparatus for posting information concerning a plurality of items, a plurality of type wheels for each item, actuating means for said wheels responsive to electric signals to move said wheels to printing position, signal circuits, means for selectively completing said signal circuits to said type wheel actuating means, a printing platen, electromagnetic means for operating the same to effect printing, a circuit for said electromagnetic means, a relay, means for operating said relay upon completion of said selecting circuit, to complete a portion of the circuit to said electromagnetic device and to close a locking circuit for said relay, means operating upon opening of said signal circuit, to complete the remainder of the circuit to said electromagnetic device, to effect printing, and means for opening said locking circuit upon operation of said electromagnetic device.

22. In a quotation printing mechanism a series of type for printing fractions values of the quotation, a type series for printing higher digits of the quotation, inking means for said type, including a separate inking device for said fractions series whereby the fractions values of a quotation may be printed in a different color from the remainder of the quotation, a platen across which paper passes, and means to produce relative movement of said platen and type series to effect printing.

23. In a quotation printing mechanism, a type wheel for printing fractions values of the quotation, type wheels for printing higher digits of said quotation, a platen across which paper passes, means to produce relative movement between said platen and type wheels to effect printing and means for imparting a distinctive apeparance to the characters printed from said fractions type wheel.

24. In a quotation printing mechanism, a type wheel for printing fractions values of the quotation, type wheels for printing higher digits of the quotation, individual inking rollers for said fractions type wheels and higher digit type wheels, the inking rollers for the fractions wheels being of different color from the remaining inking rollers, a platen across which paper extends, and means to effect printing from said type wheels simultaneously.

25. In a quotation board printing unit for an item to be posted, separate type wheels for printing each digit of said item, means individual to each type wheel for actuating the same to bring it into printing position, each of said means being separately responsive to a succession of electrical impulses received concurrently by the several means, and means to effect printing after the type wheels have been moved into position.

26. In a quotation board printing unit for an item to be posted, separate type wheels for printing each digit of said item, means individual to each type wheel for actuating the same to bring it into the printing position, each of said means being separately responsive to telegraphic signals received concurrently by the several means; and means to effect printing after the type wheels have been moved into position.

27. In a quotation board printing unit for an item to be posted, separate type wheels for printing each digit of said item, means individual to each type wheel for actuating the same to bring it into printing position, each of said means being separately responsive to telegraphic signals, and means to effect printing after the type wheels have been moved into position.

28. In combination a plurality of type wheels mounted in axial alinement for printing a plurality of successive characters, separate electromagnetic operating means for actuating each of said wheels in response to a succession of electrical impulses to move said wheels individually and concurrently into printing position, and means to effect printing after the type wheels have been moved into position.

RAY HOOVER.
EVAN R. WHEELER.